(12) United States Patent
Edwards

(10) Patent No.: US 7,353,955 B2
(45) Date of Patent: Apr. 8, 2008

(54) BAGGAGE SCREENING SYSTEM AND METHOD

(75) Inventor: Harry T. Edwards, Belmont, MI (US)

(73) Assignee: Siemens Energy & Automation, Inc., Alpharetta, GA (US)

( * ) Notice: Subject to any disclaimer, the term of this patent is extended or adjusted under 35 U.S.C. 154(b) by 0 days.

(21) Appl. No.: 10/710,442

(22) Filed: Jul. 12, 2004

(65) Prior Publication Data

US 2005/0011814 A1    Jan. 20, 2005

Related U.S. Application Data

(60) Provisional application No. 60/487,791, filed on Jul. 16, 2003.

(51) Int. Cl.
*B07C 5/00* (2006.01)

(52) U.S. Cl. .................. 209/552; 209/630; 209/922; 198/348; 198/416

(58) Field of Classification Search ............... 209/652, 209/922; 198/347.4, 348, 416
See application file for complete search history.

(56) References Cited

U.S. PATENT DOCUMENTS 4,244,672 A * 1/1981 Lund ..................... 198/350
4,550,550 A * 11/1985 Scott ..................... 53/529
5,124,554 A * 6/1992 Fowler et al. ............ 250/358.1
5,171,120 A * 12/1992 Bernard et al. .......... 414/331.03
5,427,227 A * 6/1995 Crandall et al. ......... 198/502.1
5,588,520 A * 12/1996 Affaticati et al. ....... 198/370.06
5,868,238 A * 2/1999 Bonnet .................. 198/370.1
6,471,044 B1 * 10/2002 Isaacs et al. ............ 198/809
6,789,660 B1 * 9/2004 Bruun et al. ............. 198/347.1
6,889,814 B2 * 5/2005 Cerutti et al. ............ 198/358

FOREIGN PATENT DOCUMENTS

| AU | 9715005 | * | 9/1994 |
| FR | 2 742 427 A | | 6/1997 |
| GB | 2 122 159 A | | 1/1984 |
| GB | 2 242 520 A | | 10/1991 |
| GB | 2242520 A | * | 10/1991 |
| JP | 2002 362730 A | | 12/2002 |

OTHER PUBLICATIONS

International Search Report completed Feb. 25, 2005, from corresponding PCT Application No. PCT/US2004/022909.

* cited by examiner

*Primary Examiner*—Patrick Mackey
*Assistant Examiner*—Terrell Matthews

(57) ABSTRACT

A baggage screening system and method includes providing a plurality of screening subsystems, each including an automated baggage screen device and a feed conveyor for feeding bags to the screen device. A supply conveyor is provided for supplying bags to the screen subsystems. A sortation network sorts bags downstream of the screen device as a function of the screening of the bags.

40 Claims, 5 Drawing Sheets

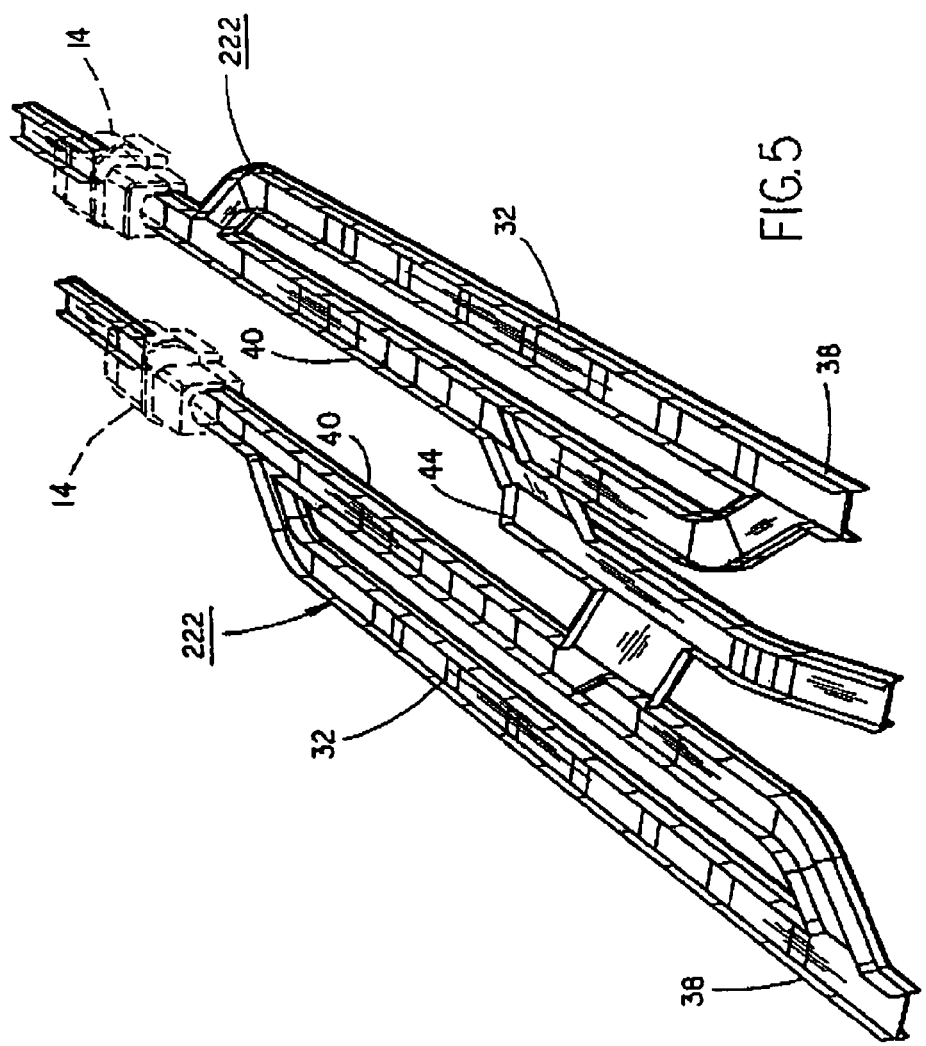

BAGGAGE SCREENING SYSTEM AND METHOD

CROSS REFERENCE TO RELATED APPLICATIONS

The present application claims the benefit of U.S. provisional application Ser. No. 60/487,791, filed Jul. 16, 2003, by Harry T. Edwards, for a BAGGAGE SCREENING SYSTEM AND METHOD, which is hereby incorporated herein by reference in its entirety.

BACKGROUND OF INVENTION

The present invention is directed to a baggage screening system and method and, in particular, to an automated system utilizing automatic baggage screen device(s). The present invention is particularly useful for screening baggage for explosive devices and/or weapons. The invention may be useful for screening baggage at airports, but may be used for screening baggage at other locations.

Baggage screening systems are used to detect explosives and/or weapons in baggage checked with an airline, or the like. While carryon baggage has been screened for many years, there is a requirement that checked baggage be screened as well. While carryon bags are transported by the passenger through the screening process, there is no corresponding individual to process checked baggage through a screening system. As a result, attempts have been made at utilizing conveyor systems to transport baggage to one or more automated baggage screen devices and from the screen devices to the bag room.

While presently proposed systems facilitate the transport of baggage through the screening process, they are by no means operator-free. Baggage systems often handle bags in a random fashion, allowing the bags to become clustered and reoriented as the bags move through the system. The bags are then queued at an automatic baggage screening device which results in starting and stopping of the bags as they move up in the queue. The result is that opportunities are present for the bags to jam, especially during heavy traffic periods. Cameras are provided to monitor areas of frequent jamming in order to allow operators to detect and manually free up a jam. This results in a significant labor content in the baggage screening system which increases the cost of baggage screening. Moreover, jams increase the likelihood of damage to the bags and the contents thereof.

SUMMARY OF INVENTION

The present invention is directed to a baggage screening system and method that reduces the potential for bag jamming and thereby minimizes the number of operators to operate the system as well as minimizing damage to the bags and their contents.

A baggage screening system and method, according to an aspect of the invention, includes providing a plurality of screening subsystems, each including an automated baggage screen device and a feed conveyor for feeding bags to the screen device. A supply conveyor is provided for supplying bags to the screening subsystems. The supply conveyor supplies bags only to a screening subsystem that has no more than a particular number of unscreened bags that are at that screening subsystem. The number of unscreened bags may be one or fewer.

A method and apparatus for screening bags, according to another aspect of the invention, includes providing a plurality of automated baggage screen devices and a conveyor system. Bags are supplied individually to the screen devices with the conveyor system in a manner that bags travel substantially only at non-zero speeds to the screen devices.

A screening module for a baggage screening system having an automated baggage screen device and a supply conveyor for supplying bags to the screening module from a supply conveyor includes a feed conveyor for feeding bags to the screen device and a sortation conveyor downstream of the screen device. The feed conveyor includes a deceleration conveyor for decreasing speeds of individual bags being supplied to the baggage screen device. The sortation conveyor sorts bags as a function of the screening of the bags.

These and other objects, advantages and features of this invention will become apparent upon review of the following specification in conjunction with the drawings.

BRIEF DESCRIPTION OF DRAWINGS

FIG. 5 is a perspective view of a pair of screening modules.

DETAILED DESCRIPTION OF THE PREFERRED EMBODIMENT

Figure 1:
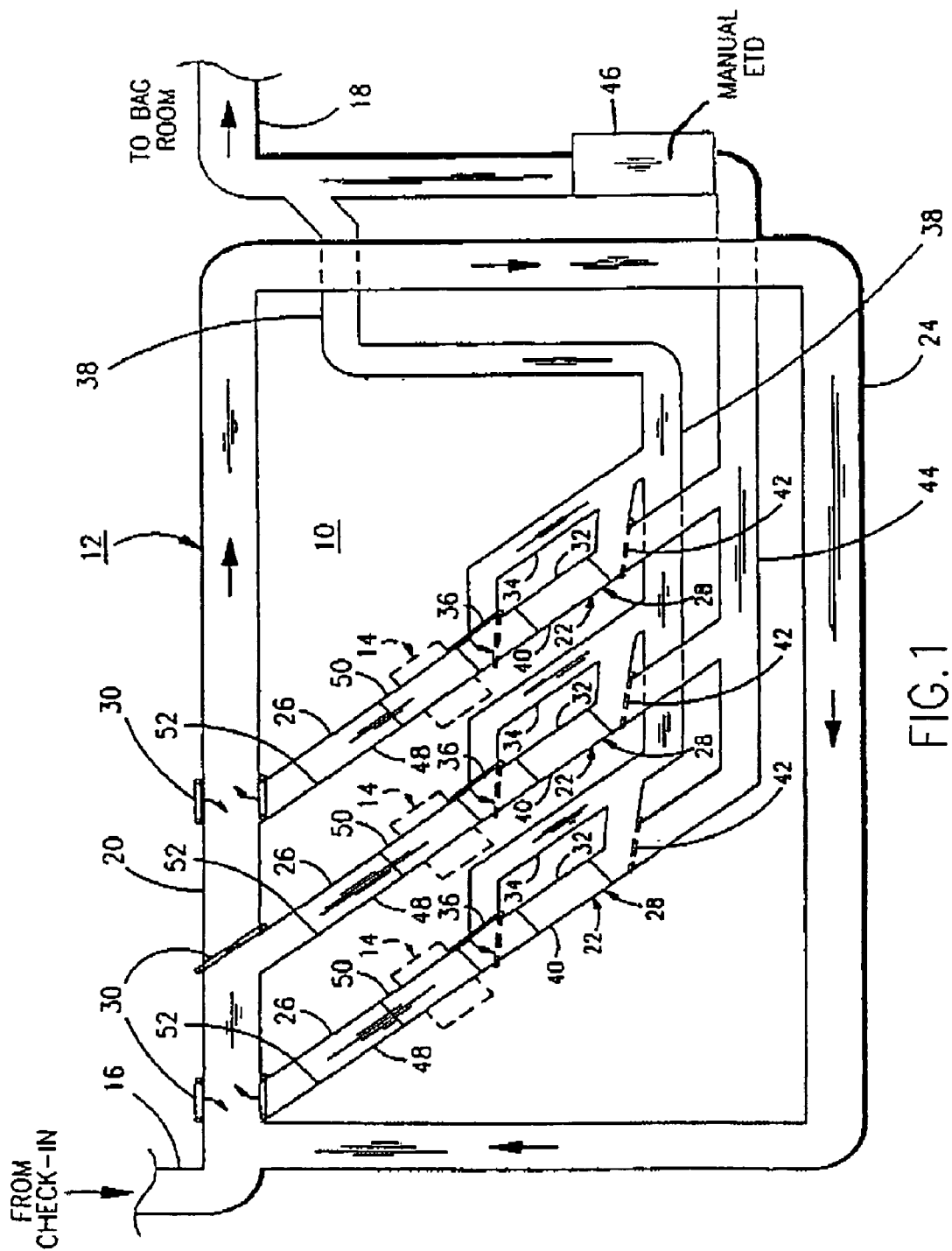
FIG. 1 is an exemplary layout of a baggage screening system, according to the invention.

Referring now specifically to the drawings, and the illustrative embodiments depicted therein, a baggage screening system 10 includes at least one, and typically a plurality of, screen device(s) 14 and a conveyor system 12. Conveyor system 12 supplies bags from an input end 16, supplied from one or more check-in counters at which bags are supplied to the system, and an output portion 18 where bags are supplied to a bag room after having passed a screening procedure. Bags may be checked in at a ticket counter or loaded by an operator who manually places the bags on a conveyor. Alternatively, the bags may be handled by a conveyor which retrieves the bags from the passenger and supplies the bags to input portion 16. Under either circumstance, bags can be expected to be supplied to input portion 16 in a singulated fashion without side-by-side bags and with the bags oriented in a particular fashion. Screen device 14 is commercially available from various suppliers, such as an EDS supplied by Invision Technologies. The particulars of the screen device are beyond the scope of the present invention. However, screen devices typically require that bags be passed through the device at a relatively slow speed, such as approximately 30 feet per minute or less. Such a speed is less than the speed of supply conveyor 20 and may be an order of magnitude less than that at which bags may be supplied at input portion 16.

Conveyor system 12 includes a supply conveyor 20 and one or more screening modules, or subsystems, 22. Supply conveyor 20 includes a recirculation conveyor 24 which recirculates bags from a downstream portion of supply conveyor 20 to an upstream portion thereof, as illustrated by the movement arrows in FIG. 1. Each screening module 22 includes a feed conveyor 26 for feeding bags from supply conveyor 20 to an associated screen device 14 and a sortation network 28 downstream of the screen device for sorting bags as a function of the outcome come of the screening of the bags. In particular, sortation network 28 sorts bags differently depending upon whether the bag passes or does not pass the initial screening. A diverter 30 is provided at an interface between supply conveyor 20 and a corresponding screening module 22. When actuated, diverter 30 diverts a bag onto the corresponding feed conveyor 26. When not actuated, the diverter allows the bag to pass to the next screening module and so on. In the illustrative embodiment, diverter 30 is of a type that controls orientation of a bag being diverted. In particular, diverter 30 is capable of aligning the bag with the general direction of movement of feed conveyor 26. One such diverter is a powered-face diverter, such as the type disclosed in commonly assigned U.S. patent application Ser. Nos. 09/921,685, filed Aug. 3, 2001, by George W. Peppel for a HIGH SPEED BAGGAGE DIVERTER, and 60/456,777, filed Mar. 21, 2003, by Stephen C. Wolf for an ASYNCHRONOUS PADDLE DIVERTER, the disclosures of which are hereby incorporated herein by reference. However, other types of diverters may be utilized provided that the orientation of the bag is maintained. In the illustrative embodiment, the first diverter 30 encountered by a bag is illustrated in a non-actuated position, while the second diverter 30 is illustrated in an actuated position thereby diverting the bag to the middle-screening module 22. The third actuator 30 in the direction of movement of the bags is also shown in an unactuated position.

Sortation conveyor network 28 includes a first leg 34 which receives bags cleared by screen device 14 and a second leg 32 which receives bags not cleared by screen device 14. A diverter 36 is capable of diverting bags either to first leg 32 or second leg 34. Diverter 36 may be of the same general configuration as diverter 30 or may be of a different configuration. Diverter 36 is expected to maintain orientation of the bag, but because the rate through each screen device 14 is lower than that on supply conveyor 20, it may be of a lesser throughput alternative design.

A bag that passes the initial screening by the screen device 14 is diverted to first leg 34 and is collected at a cleared bag conveyor 38 and supplied to output portion 18. Bags which do not pass the initial screening by screen device 14 are passed to second leg 32 for secondary screening. Second leg 32 includes a buffer conveyor 40 which allows the bag to be retained at second leg 32. In the illustrative embodiment, secondary screening is conducted by an operator, who may be located remotely from baggage screening system 10. The operator reviews an image captured by screen device 14 for that bag. The bag is retained at buffer 40 while the secondary image thereof is being reviewed. Based upon the review of the image of the bag performed at the secondary screening, the bag is either diverted to cleared bag conveyor 38 by a diverter 42 or is passed on to an uncleared conveyor line 44. Conveyor line 44 passes the bag to a manual inspection station 46. At manual inspection station 46, the bags are subjected to further inspection, such as utilizing a trace detection system or other known manual inspection technique. Bags that pass the manual screening at 46 are joined with cleared bag conveyor 38 and passed to the bag room.

Feed conveyor 26 includes a deceleration conveyor portion 48. In the illustrative embodiment, supply conveyor 20 is operated at a speed that is significantly greater than the speed of a transport conveyor 50 that transports the bags through the corresponding screen device 14. By way of example, supply conveyor 20 may operate at a speed of 425 feet per minute while transport conveyor 50 may transport the bag through the corresponding screen device at a speed of 30 feet per minute. It should be understood that these are examples only and are not intended to be limiting. With such disparity in speeds, deceleration conveyor 48 decelerates the speed of a bag from the speed of supply line 20 to the speed of transport conveyor 50. This may be accomplished by a sensor, such as a photo eye 52 which detects when a bag, which has been diverted by diverter 30, is fully positioned on deceleration conveyor 48 such as by detecting the trailing edge of the bag. The deceleration conveyor is then decelerated from the speed of supply conveyor 20 to the speed of transport conveyor 50. The bag is then discharged to transport conveyor 50 at the speed of conveyor 50. Because the transition from supply conveyor 20 to deceleration conveyor 48 and from deceleration conveyor 48 to transport conveyor 50 occurs at a consistent speed across the transition, the orientation of the bag is maintained from diverter 30 to the screening device 40. Deceleration conveyor 48 may be operated by a precision speed control, such as a variable frequency drive, servomotor drive, or the like.

Because diverter 30 controls the orientation of the bag which is initially oriented at input portion 16, it can be seen that each bag is maintained in a controlled orientation from the check-in through the screen device. This significantly reduces the possibility of bag jamming and positions the bag for proper screening at the screen device. Advantageously, a limited number, such as only one bag, is present from diverter 30 to the output of transport conveyor 50. In this manner, the bag is transported from the supply conveyor through the screen device at a non-zero speed without queuing of bags at an accumulation conveyor. This further avoids the opportunity for jamming and misorientation of the bags.

In operation, bags are supplied to input portion 16 from a bag check-in such as at a ticket counter at an airport, or the like. As the bag approaches the initial diverter 30, a determination is made by a control computer (not shown) whether a bag is present at feed conveyor 26 and/or transport conveyor 50. If not, diverter 30 is actuated and the bag is diverted to the associated screening module 22. If there is a bag at either feed conveyor 26 or transport conveyor 50, the diverter is not actuated and the bag is passed to the next screening module. Again, a determination is made whether a bag is present at the feed conveyor 26 or transport conveyor 50 of that screening module. If such a bag is not present, the diverter is actuated and the bag is diverted to that screening module for screening. This process continues until the bag is either diverted to a screening module or is recirculated by recirculation conveyor 24 back to an upstream portion, such as input portion 16, of supply conveyor 20. The baggage screening system 1 is a pull-system in which bags are diverted only when the screening module is ready to accept the bag and transport the bag through the screen device at a non-zero speed and without queuing of the bag. Bags are recirculated as needed until they arrive at an available screening module. The whole time bags are maintained in proper orientation and may be tracked by the central computer, such as by photo eyes, or the like. This also significantly reduces the necessity for frequent scanning of barcodes and or radio frequency tags on the bags.

Once a bag is inspected by screen device 14, it is not returned to the supply conveyor 20. Bags that are cleared either at the initial screening or by the secondary screening are immediately collected at a cleared bag conveyor and sent to the bag room. Bags that are not cleared by the initial or secondary screening are gathered by an uncleared conveyor and supplied to manual inspection. Such an arrangement reduces the possibility of an uncleared bag being passed to the bag room while promptly passing cleared bags to the bag room. It is also seen that the present invention provides a compact configuration that may be readily inserted into a baggage flow of an existing baggage handling system.

Figure 2:
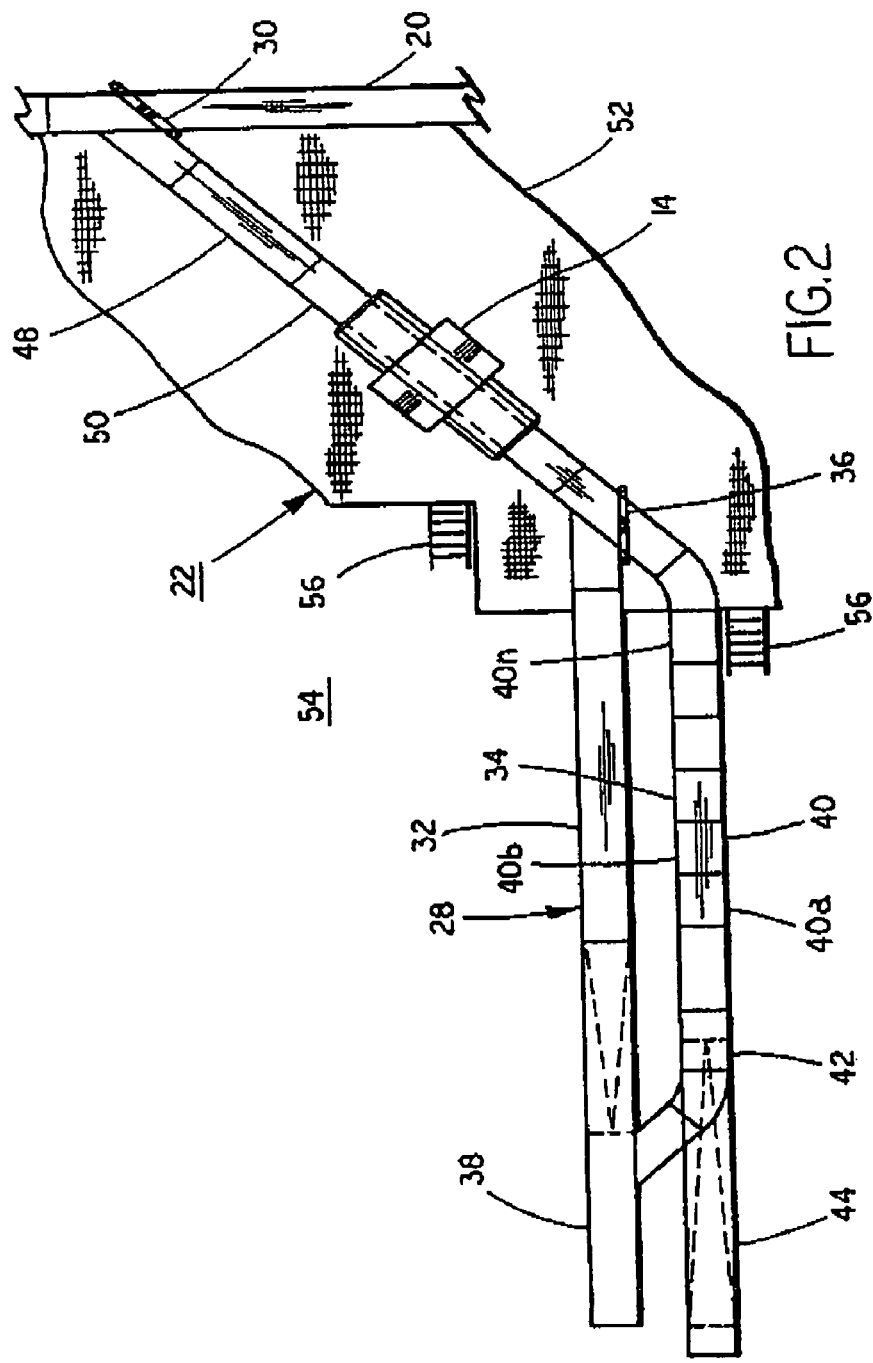
FIG. 2 is a top plan view of a screening module including a portion of a feed conveyor subsystem.

An example of a screening subsystem, or module, 22 is illustrated in FIG. 2. In the screening module illustrated therein, buffer conveyor 40 is illustrated as a series of short conveyors 40a, 40b . . . 40n. When a bag is not cleared by screen device 14, it is diverted by diverter 36 to buffer 40. The bag is transported at a low speed, such as the inspection speed of transport conveyor 50, as the bags are passed from conveyor 40n through conveyor 40a. If the bag is processed during secondary inspection, the bag continues to diverter 42. The speeds of buffer conveyor sections 40a-40n are set in order to allow sufficient time for secondary screening of the bags, such as by a manual inspection of the image produced by screening device 14. If the bag is still not screened by the time it reaches the end of buffer conveyor section 40a, the bag will be passed to conveyor 44 for subsequent manual screening. Although buffer conveyor 40 is illustrated in FIG. 2 as a series of separately driven belt conveyors, it can also be a single belt conveyor that is driven at an appropriate speed in order to allow the bags to have their images manually reviewed. In the embodiment illustrated in FIG. 2, diverter conveyor 42 is a vertical diverter, such as the type disclosed in commonly assigned U.S. patent application Ser. No. 10/054,778, filed Jan. 23, 2002, by George W. Peppel, for a VERTICAL DIVERTER ASSEMBLY, the disclosure of which is hereby incorporated herein by reference. In the embodiment illustrated in FIG. 2, vertical diverter 42 diverts uncleared bags to uncleared conveyor 44 which is at a lower elevation than buffer conveyor 40 and diverts bags cleared by the secondary screening to cleared bag conveyor 38 which is at a similar elevation to buffer 40.

Figure 3:
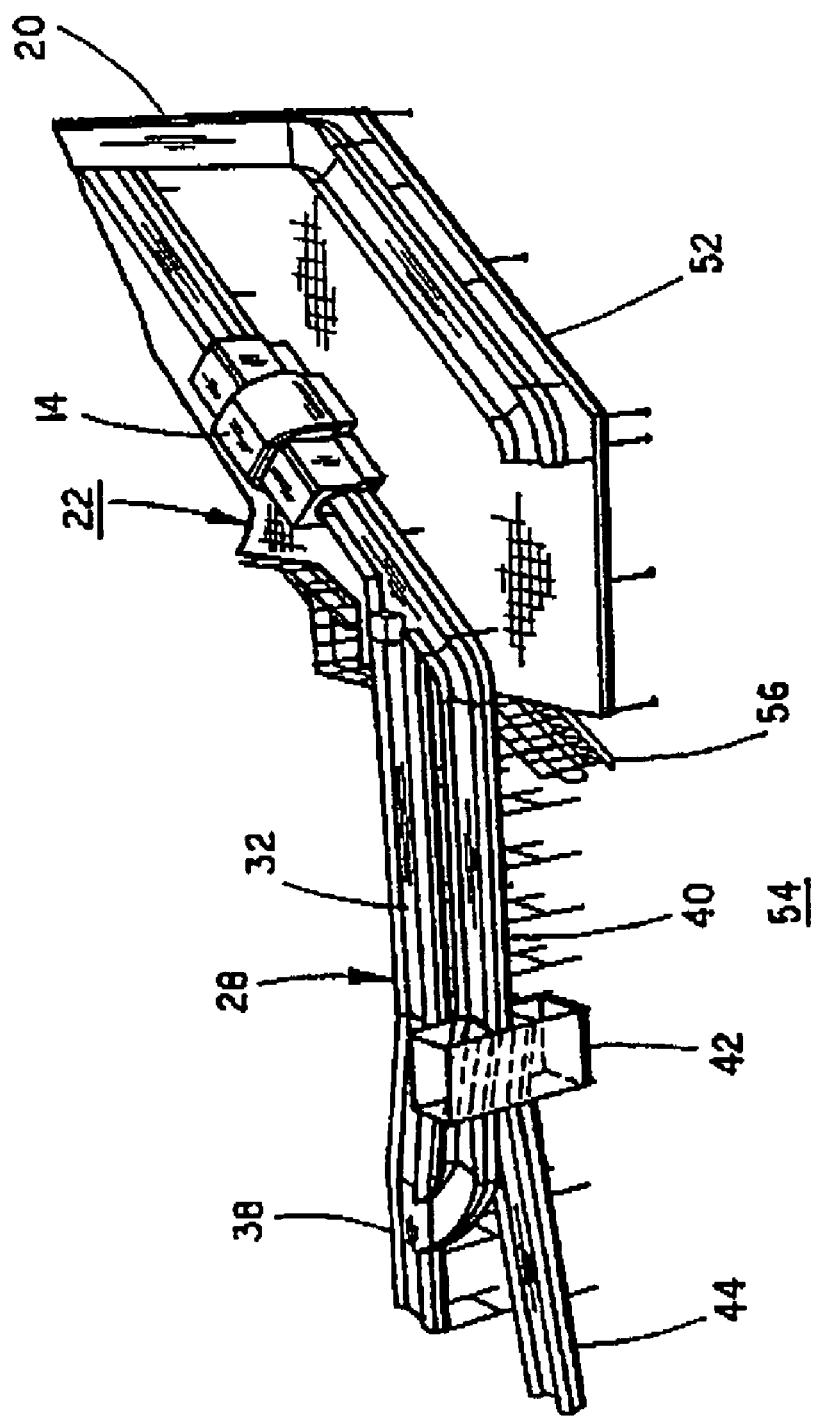
FIG. 3 is a perspective view of the screening module in FIG. 2.

Screen device 14 may be elevated at the level of an elevated platform 52 which is vertically raised above a floor 54 (FIG. 3). Platform 52 may be accessed by stairs 56 from floor 54. Screen device 14 would be supported by supports (not shown) which extend to floor level 54. In this configuration, screen device 14 may be replaced by removing a section of platform 52 and lowering the screen device to the level of floor 54, such as utilizing a conventional lift mechanism. The screen device can then pass under platform 52 or a portion of sortation conveyor network 28. This allows the screen device to be readily moved out of the baggage screening system 10 for maintenance and/or for upgrade to a new screening technology without the necessity of disassembling a portion of conveyor system 12 or utilizing overhead cranes which are expensive and require additional overhead clearance.

Figure 4:
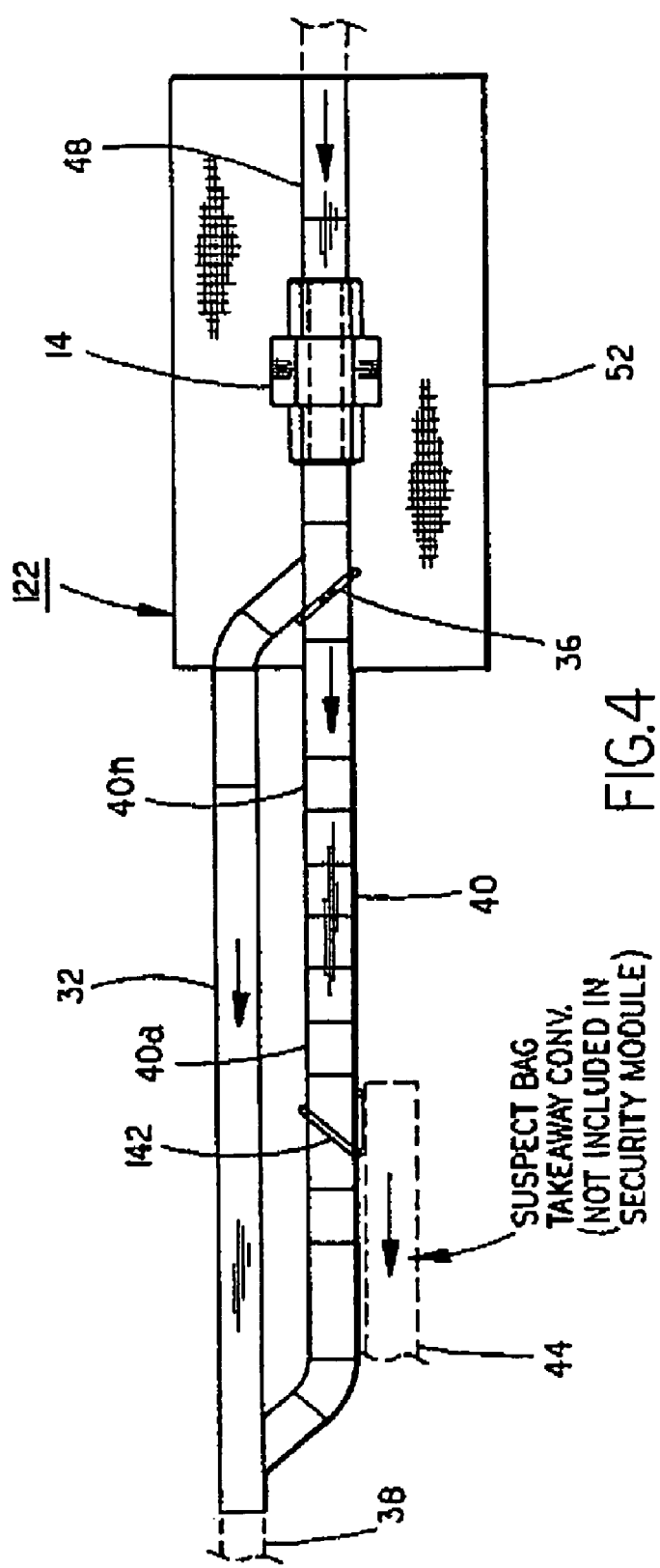
FIG. 4 is the same view as FIG. 2 of an alternative embodiment thereof.

In an alternative embodiment, a screening module 122, which is otherwise generally the same as screening module 22, utilizes a diverter 142 to divert uncleared bags to uncleared conveyor 44 which is at the same elevation as cleared bag conveyor 38. This is accomplished by a horizontal diverter 142 which laterally diverts bags not cleared by the secondary screening to uncleared conveyor 44. The advantage of the screening module in FIG. 4 is that the cost is less than that in FIGS. 2 and 3 as a result of utilizing a horizontal, rather than a vertical, divert of bags exiting the secondary screening.

In an embodiment illustrated in FIG. 5, a pair of divert modules 222 are supplied in mirror image to each other in order to utilize a common uncleared baggage conveyor 44 (FIG. 5). Otherwise, screening modules 222 are the same as screening module 122. Also, screening module 22 could be adapted to the configuration in FIG. 5.

Thus, it is seen that the present invention provides a baggage screening system that significantly reduces the opportunity for jamming of bags thereby minimizing human intervention and damage to bags and their contents. Because bags are processed through the screen device without stopping, there is minimal slippage and tumbling of bags which disrupt orientation. Indeed, speed and orientation of the bags are controlled from the check-in counter to the screen device. The "pull-system" utilized by the present invention avoids the use of queuing of bags at the screen device which ensures that bag orientation may be maintained.

Changes and modifications in the specifically described embodiments can be carried out without departing from the principles of the invention which is intended to be limited only by the scope of the appended claims, as interpreted according to the principles of patent law including the doctrine of equivalents.

The invention claimed is:

1. A baggage screening system, comprising:
   a plurality of screening subsystems, each comprising an automated bag screen device and a feed conveyor for feeding bags to said screen device, said bag screen device adapted to screen baggage for at least one chosen from weapons and explosive devices;
   a supply conveyor adapted to selectively supply bags to said screening subsystems;
   a cleared bag conveyor and an uncleared bag conveyor, said uncleared bag conveyor adapted to deliver bags to a manual screening function; and
   a sortation conveyor network downstream of said screening subsystem to selectively divert bags to said cleared bag conveyor or said uncleared bag conveyor;
   wherein said sortation conveyor network comprises a secondary bag screen system, said secondary bag screen system downstream of each said bag screen device, a first diverter between said bag screen device and said secondary bag screen system being adapted to divert a bag to either said cleared bag conveyor or said secondary bag screen system, a second diverter downstream of the associated said secondary bag screen system being adapted to divert a bag to either said cleared bag conveyor or said uncleared bag conveyor, wherein bags cleared by either said bag screen device or said secondary bag screening system are delivered to said cleared bag conveyor, wherein bags not cleared by said bag screen device are delivered to said secondary bag screen system, and wherein bags not cleared by said secondary bag screening system are delivered to said uncleared bag conveyor for delivery to said manual screening function.

2. The system of claim 1 wherein said supply conveyor includes a recirculation line for recirculating bags to an upstream portion of said supply conveyor that have not been supplied to a screening subsystem.

3. The system of claim 1 wherein bags are transported through said screen device at a first speed and said supply conveyor operates at a second speed that is greater than said first speed and wherein said feed conveyor includes a deceleration conveyor.

4. The system of claim 3 wherein said deceleration conveyor receives a bag at said second speed and decelerates said bag to said first speed.

5. The system of claim 1 including an input diverter at each of said screening subsystems for selectively diverting a bag to that screening subsystem, said input diverter controlling orientation of a bag being diverted.

6. The system of claim 5 wherein said input diverter is a powered-face diverter.

7. A baggage screening system, comprising:
 a plurality of screening subsystems, each comprising an automated bag screen device and a feed conveyor for feeding bags to said screen device, said bag screen device adapted to screen baggage for at least one chosen from weapons and explosive devices;
 a supply conveyor adapted to selectively supply bags to said screening subsystems, said supply conveyor supplying bags only to a screening subsystem that has no more than a particular number of unscreened bags that are at that screening subsystem;
 a cleared bag conveyor and an uncleared bag conveyor; and
 a sortation conveyor network downstream of said screening subsystem to selectively divert bags to said cleared bag conveyor or said uncleared bag conveyor;
 wherein said sortation conveyor network comprises a secondary bag screen system, said secondary bag screen system downstream of each said bag screen device, a first diverter between said bag screen device and said secondary bag screen system being adapted to divert a bag to either said cleared bag conveyor or said secondary bag screen system, a second diverter downstream of the associated said secondary bag screen system being adapted to divert a bag to either said cleared bag conveyor or said uncleared bag conveyor, wherein bags cleared by either said bag screen device or said secondary bag screening system are delivered to said cleared bag conveyor, wherein bags not cleared by said bag screen device are delivered to said secondary bag screen system, and wherein said secondary bag screening system uses images of bags captured by said screen device and includes a display, said display adapted to display the bag images captured by said screen device.

8. The system of claim 7 wherein bags are not queued at said feed conveyor.

9. The system of claim 7 wherein bags travel substantially only at non-zero speeds through said supply conveyor and said feed conveyor.

10. A screening module for a baggage screening system having an automated bag screen device and a supply conveyor adapted to selectively supply bags to said screening module from a supply conveyor, said screening module comprising:
 a feed conveyor for feeding bags to the screen device and a sortation conveyor network downstream of said screen device, said bag screen device adapted to screen baggage for at least one chosen from weapons and explosive devices;
 a cleared bag conveyor and an uncleared bag conveyor, said uncleared bag conveyor adapted to deliver bags to a manual screening function;
 said feed conveyor comprising a deceleration conveyor for decreasing speeds of individual bags being supplied to said bag screen device; and
 said sortation conveyor network sorting bags as a function of the screening of the bags wherein said sortation conveyor network selectively diverts bags to said cleared bag conveyor or said uncleared bag conveyor;
 wherein said sortation conveyor network comprises a secondary bag screen system, said secondary bag screen system downstream of each said bag screen device, a first diverter between said bag screen device and said secondary bag screen system being adapted to divert a bag to either said cleared bag conveyor or said secondary bag screen system, a second diverter downstream of the associated said secondary bag screen system being adapted to divert a bag to either said cleared bag conveyor or said uncleared bag conveyor, wherein bags cleared by either said bag screen device or said secondary bag screening system are delivered to said cleared bag conveyor, wherein bags not cleared by said bag screen device are delivered to said secondary bag screen system, and wherein bags not cleared by said secondary bag screening system are delivered to said uncleared bag conveyor for delivery to said manual screening function.

11. The module of claim 10 wherein said secondary bag screening system uses images of bags captured by said screen device.

12. The module of claim 10 wherein bags are not queued at said feed conveyor.

13. The module of claim 10 wherein bags travel substantially only at non-zero speeds through said feed conveyor.

14. The module of claim 10 wherein said screen device is mounted substantially above floor level.

15. A method of screening bags, comprising:
 providing a plurality of automated bag screen devices and a conveyor system, said bag screen devices adapted to screen baggage for at least one chosen from weapons and explosive devices;
 supplying bags individually to said screen devices with said conveyor system;
 providing a cleared bag conveyor and an uncleared bag conveyor;
 delivering bags on said uncleared bag conveyor to a manual screening function;
 providing a sortation conveyor network downstream of said screen devices to selectively divert bags to said cleared bag conveyor or said uncleared bag conveyor;
 wherein said sortation conveyor network comprises a secondary bag screen system, said secondary bag screen system downstream of each said screen device and a first diverter between said bag screen device and said secondary bag screen system;
 diverting a bag to either said cleared bag conveyor or said uncleared bag conveyor with said first diverter; and
 diverting a bag to either said cleared bag conveyor or said uncleared bag conveyor with a second diverter downstream of the associated said secondary bag screen system;
 wherein bags cleared by either said bag screen device or said secondary bag screening system are diverted to said cleared bag conveyor, wherein bags not cleared by said bag screen device are delivered to said secondary bag screen system, and wherein bags not cleared by said secondary bag screening system are delivered to said uncleared bag conveyor for delivery to said manual screening function.

16. The method of claim 15 including supplying bags only to screening devices that have at least partially screened each of the bags that have been supplied to that screening device.

17. The method of claim 15 wherein said conveyor system includes feed conveyors, each for feeding bags to one of said screen devices and a supply conveyor for supplying bags to said feed conveyors.

18. The method of claim 17 including recirculating bags to an upstream portion of said supply conveyor that have not been supplied to a feed conveyor.

19. The method of claim 17 including transporting bags through said screen device at a first speed and at said supply conveyor at a second speed that is greater than said first speed, including providing a deceleration conveyor at said feed conveyor.

20. The method of claim 19 including receiving a bag with said deceleration conveyor at said second speed and decelerating said bag to said first speed.

21. The method of claim 15 including providing an input diverter for each of said screen devices and selectively diverting a bag to a screen device with the corresponding input diverter including controlling orientation of a bag being diverted.

22. The method of claim 21 wherein said diverter is a powered-face diverter.

23. A method of screening bags, comprising:
providing a plurality of automated bag screen devices and a conveyor system, said bag screen devices adapted to screen baggage for at least one chosen from weapons and explosive devices;
supplying bags individually to said screen devices with said conveyor system;
providing a cleared bag conveyor and an uncleared bag conveyor;
providing a sortation conveyor network downstream of said screen devices to selectively divert bags to said cleared bag conveyor or said uncleared bag conveyor;
wherein said sortation conveyor network comprises a secondary bag screen system, said secondary bag screen system downstream of each said screen device and a first diverter between said bag screen device and said secondary bag screen system;
screening bags at said secondary bag screening system using images of bags captured by said screen device;
diverting a bag to either said cleared bag conveyor or said uncleared bag conveyor with said first diverter; and
diverting a bag to either said cleared bag conveyor or said uncleared bag conveyor with a second diverter downstream of the associated said secondary bag screen system;
wherein bags cleared by either said bag screen device or said secondary bag screening system are delivered to said cleared bag conveyor.

24. The method of claim 23 including not queuing bags at said feed conveyor.

25. The system of claim 1 wherein said supply conveyor supplies bags only to a screening subsystem that has no more than a particular number of unscreened bags that are at that screening subsystem.

26. The system of claim 7 wherein said supply conveyor includes a recirculation line for recirculating bags to an upstream portion of said supply conveyor that have not been supplied to a screening subsystem.

27. The system of claim 7 wherein bags are transported through said screen device at a first speed and said supply conveyor operates at a second speed that is greater than said first speed and wherein said feed conveyor includes a deceleration conveyor.

28. The system of claim 27 wherein said deceleration conveyor receives a bag at said second speed and decelerates said bag to said first speed.

29. The system of claim 7 including an input diverter at each of said screening subsystems for selectively diverting a bag to that screening subsystem, said input diverter controlling orientation of a bag being diverted.

30. The system of claim 29 wherein said input diverter is a powered-face diverter.

31. The method of claim 23 including supplying bags only to screening devices that have at least partially screened each of the bags that have been supplied to that screening device.

32. The method of claim 23 wherein said conveyor system includes feed conveyors, each for feeding bags to one of said screen devices and a supply conveyor for supplying bags to said feed conveyors.

33. The method of claim 32 including recirculating bags to an upstream portion of said supply conveyor that have not been supplied to a feed conveyor.

34. The method of claim 32 including transporting bags through said screen device at a first speed and at said supply conveyor at a second speed that is greater than said first speed, including providing a deceleration conveyor at said feed conveyor.

35. The method of claim 34 including receiving a bag with said deceleration conveyor at said second speed and decelerating said bag to said first speed.

36. The baggage screening system of claim 1, wherein said secondary bag screen system further comprises a buffer downstream of each said bag screen device, said buffer adapted to buffer bags for the associated said secondary bag screen system, and wherein the associated said first diverter is upstream of the associated said buffer and the associated said second diverter is downstream of the associated said secondary bag screen system.

37. The baggage screening system of claim 7, wherein said secondary bag screen system further comprises a buffer downstream of each said bag screen device, said buffer adapted to buffer bags for the associated said secondary bag screen system, and wherein the associated said first diverter is upstream of the associated said buffer and the associated said second diverter is downstream of the associated said secondary bag screen system.

38. The baggage screening system of claim 10, wherein said secondary bag screen system further comprises a buffer downstream of each said bag screen device, said buffer adapted to buffer bags for the associated said secondary bag screen system, and wherein the associated said first diverter is upstream of the associated said buffer and the associated said second diverter is downstream of the associated said secondary bag screen system.

39. The method of claim 15, wherein said sortation conveyor network further comprises a buffer, said method further comprising buffering bags for said secondary bag screening system with said buffer.

40. The method of claim 23, wherein said sortation conveyor network further comprises a buffer, said method further comprising buffering bags for said secondary bag screening system with said buffer.

* * * * *